United States Patent [19]

Matsubara

[11] Patent Number: 5,274,221

[45] Date of Patent: Dec. 28, 1993

[54] NON-CONTACT INTEGRATED CIRCUIT CARD

[75] Inventor: Toshiyuki Matsubara, Itami, Japan

[73] Assignee: Mitsubishi Denki Kabushiki Kaisha, Tokyo, Japan

[21] Appl. No.: 22,882

[22] Filed: Feb. 16, 1993

Related U.S. Application Data

[63] Continuation of Ser. No. 643,290, Jan. 22, 1991, abandoned.

[30] Foreign Application Priority Data

Jun. 22, 1990 [JP] Japan .................. 2-162806

[51] Int. Cl.⁵ .............................................. G06K 7/08
[52] U.S. Cl. ................................................... 235/492
[58] Field of Search .................. 235/492, 493; 902/26

[56] References Cited

U.S. PATENT DOCUMENTS

| 4,800,255 | 1/1989 | Imran | 235/492 |
| 5,068,521 | 11/1991 | Yamaguchi | 235/492 |
| 5,105,074 | 4/1992 | Nara | 235/492 |

FOREIGN PATENT DOCUMENTS

| 0196028 | 10/1986 | European Pat. Off. . |
| 0256594 | 2/1988 | European Pat. Off. . |
| 3622246 | 1/1987 | Fed. Rep. of Germany . |
| 3711601 | 10/1987 | Fed. Rep. of Germany . |
| 62-034292 | 2/1987 | Japan . |

*Primary Examiner*—John Shepperd
*Attorney, Agent, or Firm*—Leydig, Voit & Mayer

[57] ABSTRACT

A non-contact integrated card includes a data transmitting and receiving circuit, a data processing unit connected with the data transmitting and receiving circuit, a clock generating circuit for generating a clock signal and for supplying the clock signal to the data processing unit, a battery for supplying electrical energy to the data transmitting and receiving circuit, the data processing unit and the clock generating circuit, and a clock stopping circuit for stopping the generation of the clock signal by the clock generating circuit upon receipt of a clock stop signal from outside of the card. The inclusion of the clock stopping circuit which stops the generation of the clock signal in response to a clock stop signal input from an external circuit makes it possible to suspend the consumption of energy produced by the battery after testing, during shipping, and before use of the card.

7 Claims, 5 Drawing Sheets

NON-CONTACT INTEGRATED CIRCUIT CARD

This application is a continuation of application Ser. No. 07/643,290, filed Jan. 22, 1991, now abandoned.

BACKGROUND OF THE INVENTION

1. Field of the Invention

The present invention relates to a non-contact integrated circuit card and, more specifically, to a non-contact integrated circuit card that incorporates a battery as a power supply.

2. Description of the Related Art

The construction of a conventional non-contact integrated circuit card is shown in FIG. 6. A CPU 1 for processing data and for controlling the operation of the card is connected with a ROM 2 and a RAM 3 via a bus 8. The ROM 2 is provided for storing programs, while the RAM 3 is provided for storing data. The bus 8 is connected with an input-output (I/O) control circuit 5 for controlling the inputting of data from and outputting of data to an external apparatus (not shown). The I/O control circuit 5 is connected, via a modulation/-demodulation circuit 6, with an antenna 7. The card also includes a battery 4 incorporated therein for supplying electrical energy to the above-described electric circuits.

With such a card, when a signal to be input, which is in the form of an electromagnetic wave, is received from an external apparatus by the antenna 7, the signal is digitized by the modulation/demodulation circuit 6. Thereafter, the signal is input to the CPU 1 via the I/O control circuit 5. The CPU 1 processes the input signal in accordance with the programs stored in the ROM 2, and stores data in the RAM 3 in accordance with necessity. Data to be output in response to an external apparatus, such as the results of processing, are supplied, via the I/O control circuit 5, to the modulation/demodulation circuit 6, in which the data are converted into analog equivalents. Thereafter, the data are transmitted as electromagnetic waves via the antenna 7 to the external apparatus.

In order that the card can receive a signal from an external apparatus and process the input signal, each of the electric circuits incorporated in the card must always be supplied with electric current from the battery 4 so that the card stands by in its state of being capable of receiving. However, after the battery 4 is incorporated in the card during the manufacturing of the card, the flow of electric current from the battery 4 continues even before the shipment of the card. Therefore, the energy produced by the battery 4 is rapidly consumed.

Because of the shape of the card, the battery 4 incorporated therein must be very thin. For this reason, it is impossible to incorporate a battery having a large current capacity. Furthermore, since the outer periphery of the card is normally enclosed by an outer cover made of plastic or the like, it is impossible to replace the battery 4 with a new battery.

Consequently, the conventional card has a problem in that the life of the battery 4 after the card is placed on the market, that is, the period during which the card is usable, is short. Another problem is that the durability of the batteries of the cards placed on the market varies depending on the length of the period from the incorporation of the battery 4 in the card to the shipment of the card.

SUMMARY OF THE INVENTION

Accordingly, an object of the present invention is to provide a non-contact card that has, when placed on the market, a long usable period.

In order to achieve the above object, according to the present invention, there is provided a non-contact card comprising: data transmitting and receiving means for transmitting and receiving data; a data processing means, connected with the data transmitting and receiving means; a clock generating means, for processing data for generating a clock signal and for supplying the clock signal to the data processing means; a battery for supplying electrical energy to the data transmitting and receiving means, the data processing means and the clock generating means; and a clock stopping means for stopping the generation of the clock signal by the clock generating means upon inputting a clock stop signal from outside of the card.

According to the present invention, the clock stopping means stops, in response to a clock stop signal input from an external circuit, the operation of the clock generating means, thereby suspending the consumption of energy produced by the battery.

DESCRIPTION OF THE PREFERRED EMBODIMENTS

The preferred embodiments of the present invention will now be described with reference to the accompanying drawings.

Figure 1:
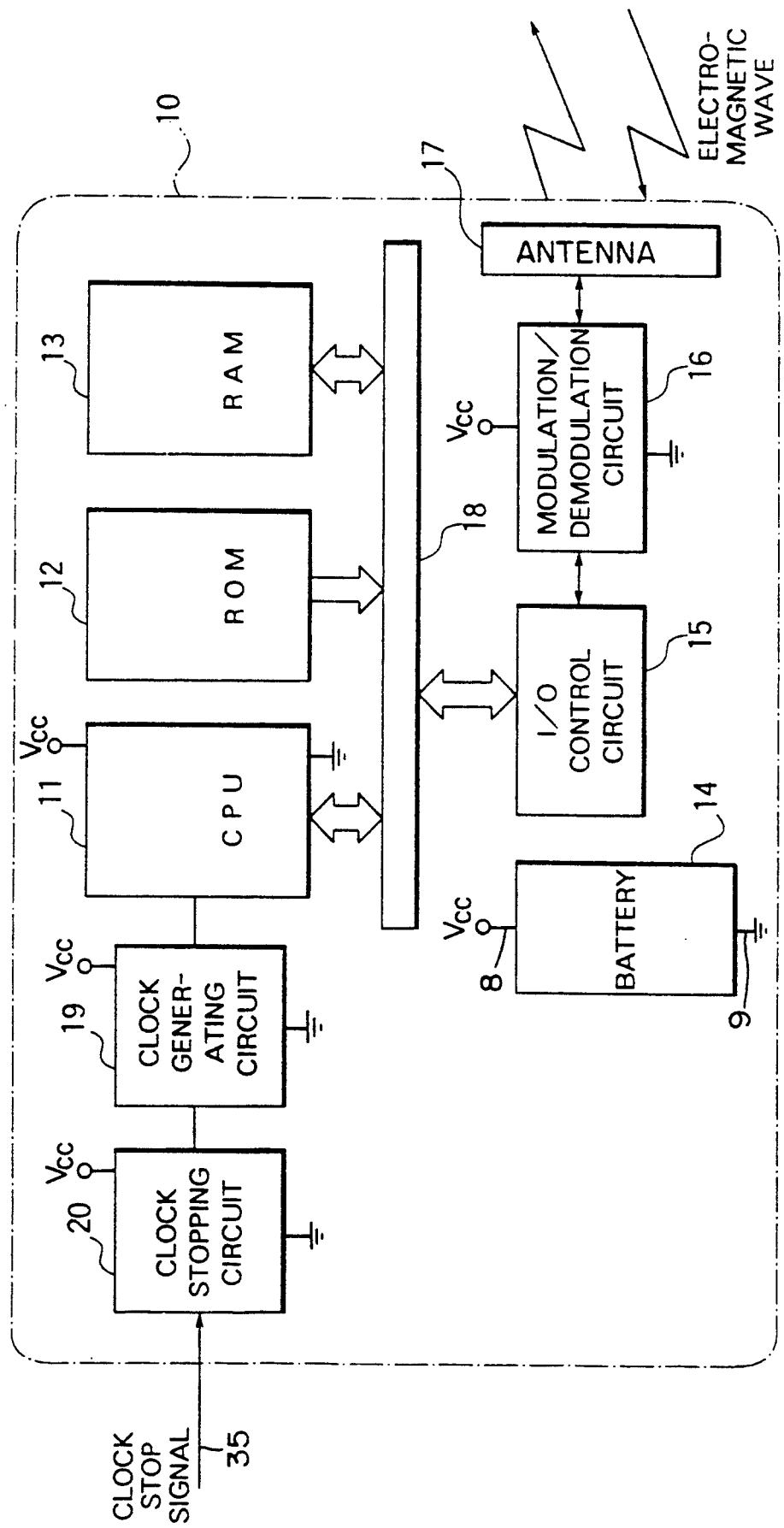
FIG. 1 is a block diagram showing the construction of a non-contact card according to one embodiment of the present invention.

Referring to FIG. 1, a non-contact integrated circuit card 10 according to one embodiment of the present invention has a CPU 11 to which a bus 18 is connected. The bus 18 is also connected with a ROM 12 for storing programs in accordance with which the operation of the CPU 11 is controlled, a RAM 13 for storing data, and an input-output (I/O) control circuit 15 for controlling the inputting of data from and outputting of data to an external apparatus (not shown). The I/O control circuit 15 is connected with a modulation/demodulation circuit 16 which is in turn connected with an antenna 17.

The CPU 11 is connected with a clock generating circuit 19 for supplying a clock signal to the CPU 11, and the clock generating circuit 19 is connected with a clock stopping circuit 20 for stopping, in response to a clock stop signal applied to an input terminal 35 of to the card 10, the operation of the clock generating circuit 19. The card 10 also has a battery 14 including a power terminal 8 and a ground terminal incorporated therein for supplying electrical energy to the electric circuits within the card 10.

The modulation/demodulation circuit 16 and an antenna 17 comprise data transmitting and receiving means, the CPU 11 comprises a data processing means, the clock generating circuit 19 comprises a clock generating means, and the clock stopping circuit 20 comprises a clock stopping means.

Figure 2:
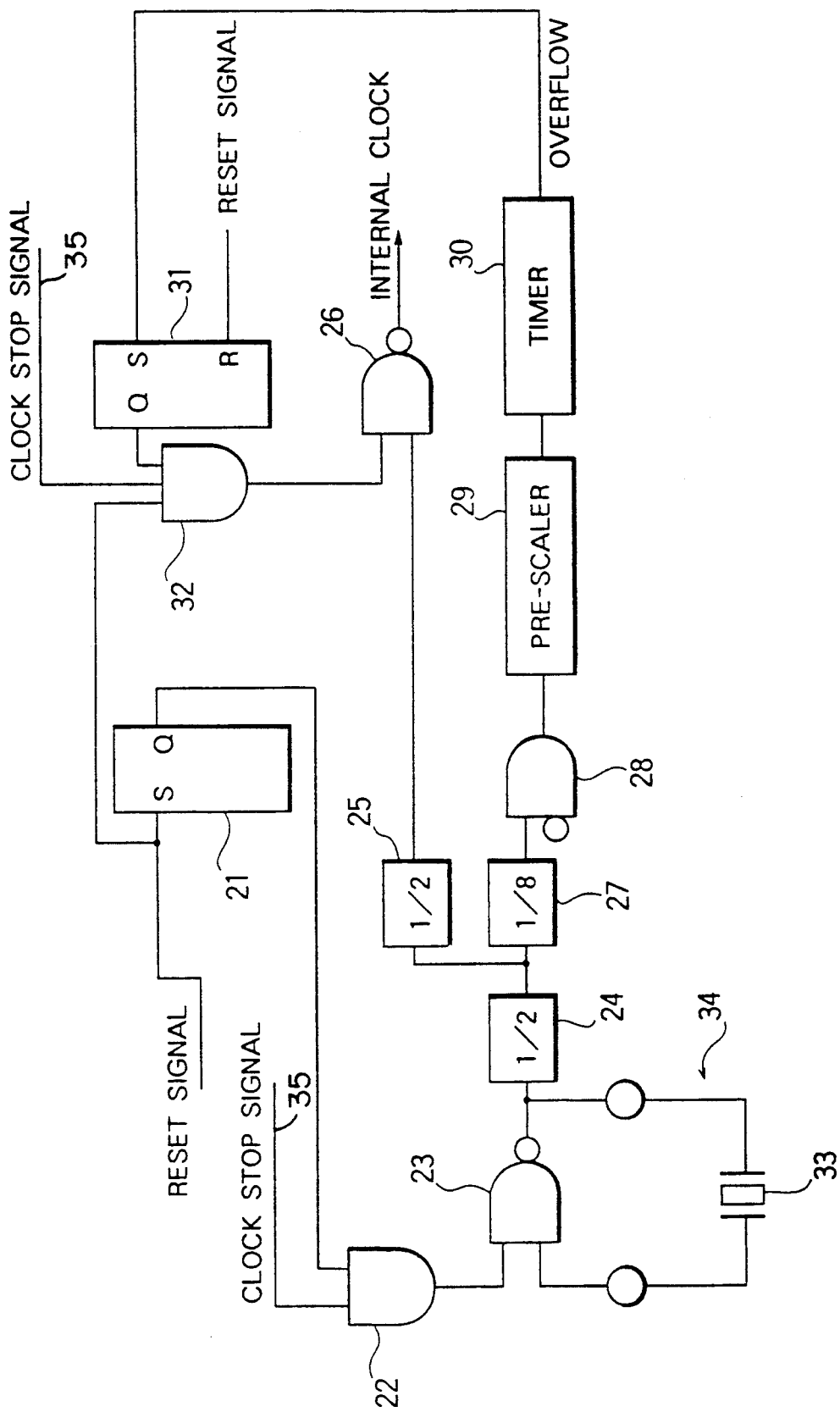
FIG. 2 is a block diagram showing the internal construction of a clock generating circuit of the card and a clock stopping circuit of the same.

FIG. 2 shows the internal construction of the clock generating circuit 19 and the clock stopping circuit 20. The output terminal Q of a first flip-flop 21 is connected, via a first AND circuit 22, a first NAND circuit 23 and ½ frequency-dividers 24 and 25, with a second NAND circuit 26. The NAND circuit 26 is connected to the CPU 11. The output of the ½ frequency-divider 24 is also connected, via a ½ frequency-divider 27, a second AND circuit 28, a pre-scaler 29 and a timer 30, with the set terminal S of a second flip-flop 31. The output terminal Q of the second flip-flop 31 is connected, via a third AND circuit 32, with the second NAND circuit 26. The first NAND circuit 23 is connected with a resonator 33. The first NAND circuit 23 and the resonator 33 constitute a resonant circuit 34.

Next, the operation of the embodiment will be described. In the process for manufacturing the card, the individual circuits, shown in FIG. 1, of the non-contact card 10 are fabricated, and the battery 14 is mounted on the card 10. Thereafter, product tests are performed as required. Prior to the tests, regarding the construction shown in FIG. 2, a reset signal is input to the set terminal S of the first flip-flop 21 and the reset terminal R of the second flip-flop 31. Further, a clock stop signal at a high ("H") level is input to each of the first and third AND circuits 22 and 32. The first flip-flop 21, whose set terminal S has input a reset signal, outputs, from its output terminal Q, an oscillation permit signal at "H" level to the first NAND circuit 23 via the first AND circuit 22. This output starts oscillation of the resonant circuit 34. The output of the resonant circuit 34 has its frequency reduced to ¼ by the ½ frequency-dividers 24 and 25, and then is output as an internal clock from the second NAND circuit 26. Actually, in order to provide a delay until the oscillation waveform stabilizes, the ½ frequency-divider 27, the pre-scaler 29, timer 30 and the second flip-flop 31 cooperate with each other in such a manner that an internal clock is output after a predetermined period passes from the start of oscillation of the resonant circuit 34, i.e., until overflow of the timer 30.

The internal clock signal generated in this way renders the CPU 11 operable. In this state, product tests are performed in order to check whether the non-contact card 10 operates normally.

When the product tests have been completed, a clock stop signal at a low ("L") level is input to each of the first and third AND circuits 22 and 32. This input makes the AND circuit 22 prevent the oscillation permit signal from the first flip-flop 21 from being input to the first NAND circuit 23. Accordingly, the oscillation of the resonant circuit 34 stops. The inputting of the L-level clock stop signal to the third AND circuit 32 makes the AND circuit 32 prevent the output from the second flip-flop 31 from being input to the second NAND circuit 26. Thus, the generation of the internal clock from the NAND circuit 26 stops. As a result, the operation of the CPU 11 stops and, accordingly, the entire function of the card 10 stops so that the consumption of energy produced by the battery 14 is suspended until the internal clock signal is again generated.

In this way, after product tests, the consumption of electrical energy produced by the battery 14 is suspended until shipment. Therefore, it is possible to avoid any consumption of energy produced by the battery 14 during the manufacturing process, and hence, to increase and stabilize the usable period of the non-contact card 10 after it is placed on the market.

The generation of the internal clock signal may again be started immediately before the shipment of the card 10 so that the card 10 is shipped while in an operating state. Alternatively, the non-contact card 10 may be shipped while the generation of the internal clock is stopped, and the generation of the internal clock may be re-started by the user immediately before use is started.

Figure 6:
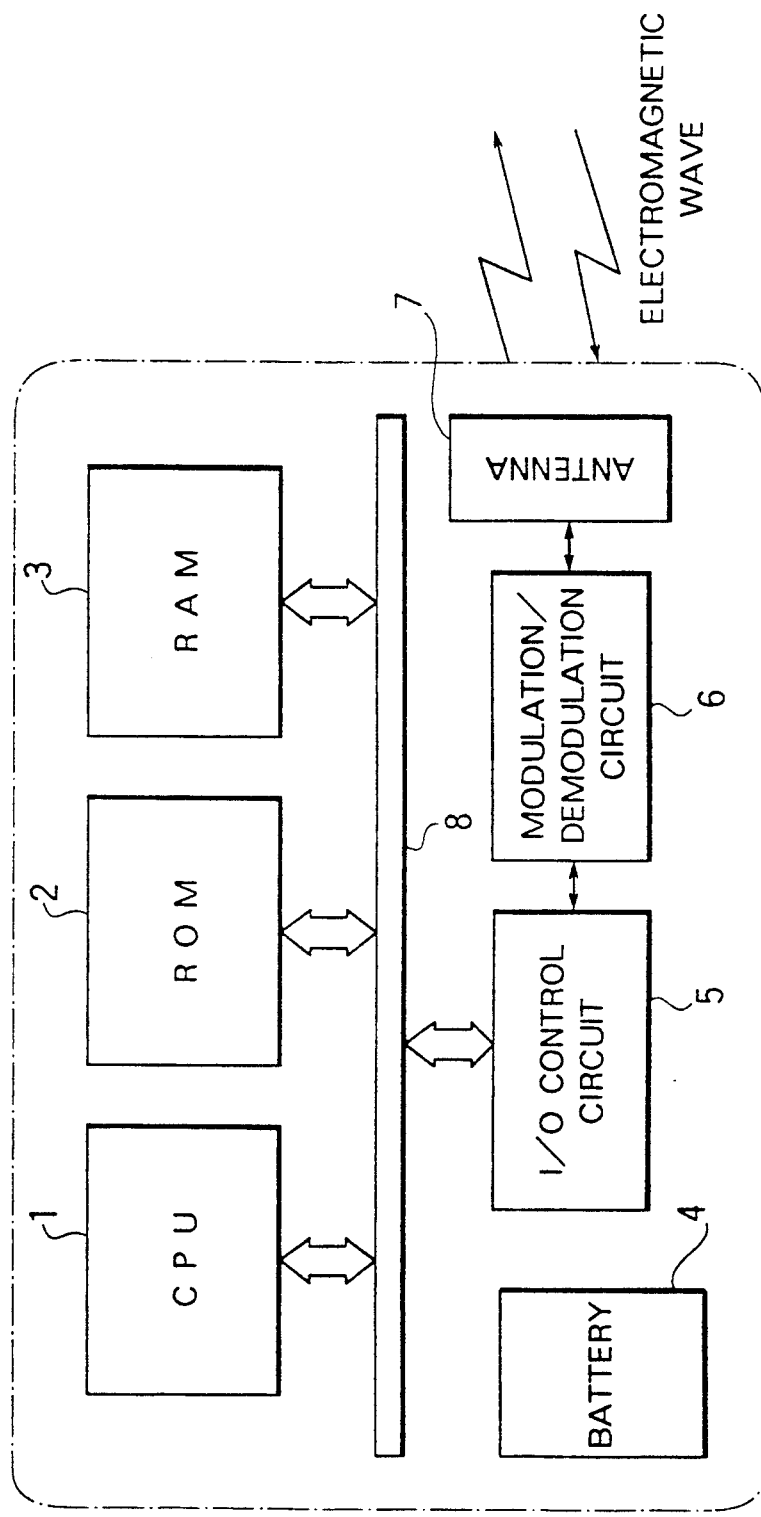
FIG. 6 is a block diagram showing the construction of a conventional non-contact card.

During use, the non-contact integrated circuit card 10 transmits data to and receives data from an external apparatus in a manner similar to that of the conventional card shown in FIG. 6. That is, when a signal to be input, which is in the form of an electromagnetic wave, is received from an external apparatus (not shown) by the antenna 17, the input signal is digitized by the modulation/demodulation circuit 16. Thereafter, the signal is input to the CPU 11 via the I/O control circuit 15. The CPU 11 processes the input signal in accordance with the programs stored in the ROM 12, and stores data in the RAM 13 in accordance with necessity. Data to be output in response to an external apparatus, such as the results of the processing, are supplied, via the I/O control circuit 15, to the modulation/demodulation circuit 16, in which the data are converted into analog equivalents. Thereafter, the data are transmitted as electromagnetic waves from the antenna 17 to the external apparatus.

Figure 3:
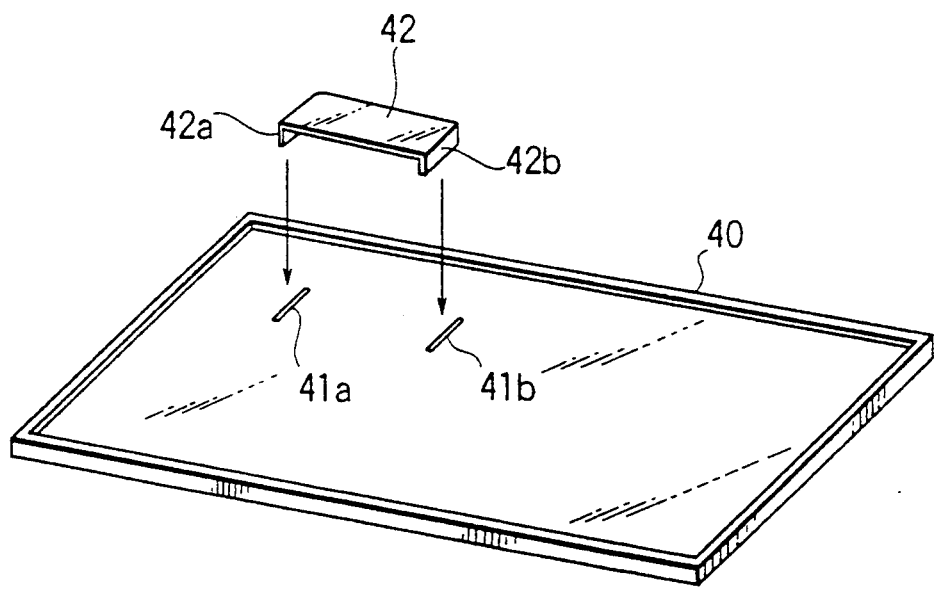
FIGS. 3 through 5 are views showing different methods of inputting a clock stop signal.

A clock stop signal is input to the AND circuits 22 and 32 shown in FIG. 2 in, for instance, the following manner. As shown in FIG. 3, an outer cover of a sealed card 40 is formed with a pair of insertion holes 41a and 41b. A pair of leg portions 42a and 42b of a conductive member 42 are inserted into the holes 41a and 41b, respectively. One of the insertion holes 41a is formed at a position corresponding to one of the respective input terminals of the first and third AND circuits 22 and 32 shown in FIG. 2, and the other insertion hole 41b is formed at a position corresponding to a grounding line (not shown). When the leg portions 42a and 42b of the conductive member 42 are inserted and brought into contact with the input terminals of the AND circuits 22 and 32, and the grounding line, respectively, a clock stop signal at "L" level is input, through the conductive member 42, to the AND circuits 22 and 32. With this method, the generation of the internal clock can be easily controlled even after the card 40 is sealed. That is, after the product tests, the conductive member 42 is mounted on the card 40, and, thereafter, the member 42 is removed from the card 40 immediately before shipment or use.

Figure 4:
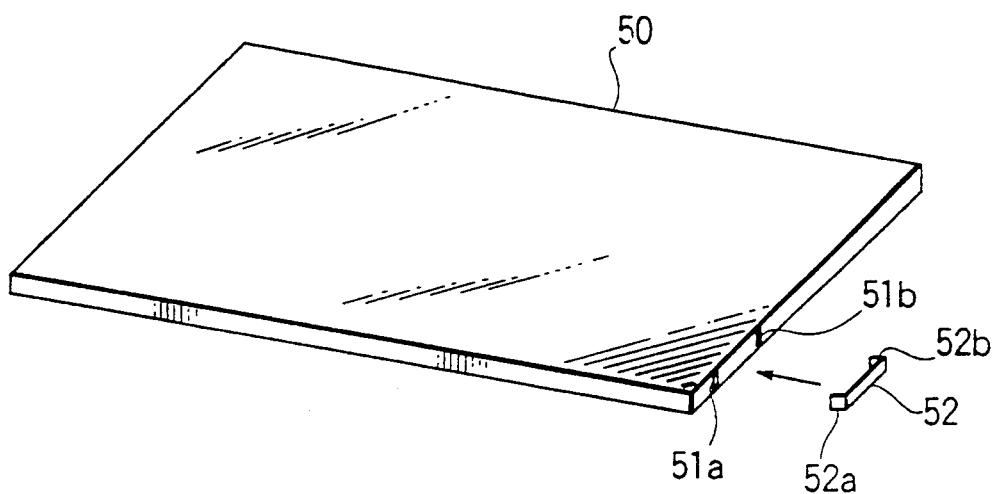
Figure 5:
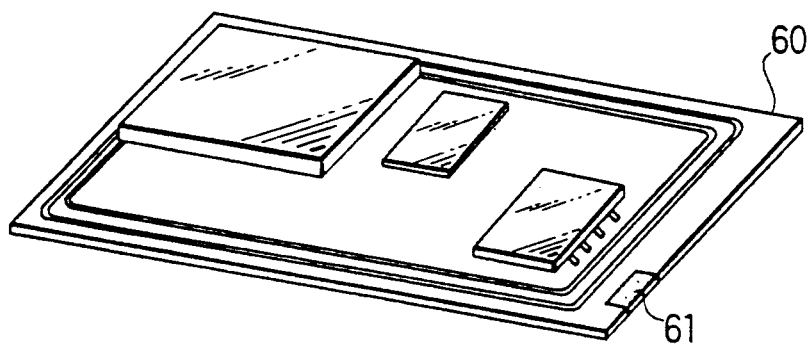

Alternatively, the clock stop signal may be input by, as shown in FIG. 4, forming insertion holes 51a and 51b at a side portion of a card, and inserting therein leg portions 52a and 52b of a conductive member 52.

In still another alternative, a substrate 60 on which the above-described circuits are mounted may have a terminal 61 formed in a part thereof, the terminal 61 being connected with one of the respective input terminals of the first and third AND circuits 22 and 32 shown in FIG. 2. When a grounded contact member (not shown) such as a grounded clip or the like is brought into contact with the terminal 61, the terminal 61 is brought to the ground level.

What is claimed is:

1. A non-contact integrated circuit card comprising:
   data transmitting and receiving means for transmitting and receiving data;

data processing means connected to said data transmitting and receiving means for processing data;

clock generating means for generating a clock signal and for supplying the clock signal to said data processing means;

a battery having a power terminal and a ground terminal for supplying electrical energy to said data transmitting and receiving means, said data processing means, and said clock generating means; and clock stopping means powered by said battery, connected to said clock generating means, and having an input terminal, said clock stopping means for stopping generation of the clock signal by said clock generation means upon electrical connection of said input terminal to said ground terminal.

2. The non-contact integrated circuit card as claimed in claim 1 wherein said clock stopping means includes a gate circuit that closes upon connection of said input terminal to said ground terminal.

3. The non-contact integrated circuit card as claimed in claim 1 including a separate electrically conductive member for electrically connecting said input terminal to said ground terminal.

4. The non-contact integrated circuit card as claimed in claim 3 wherein said conductive member has a first leg portion connectable to the input terminal and a second leg portion connectable to said ground terminal.

5. The non-contact integrated circuit card as claimed in claim 4 comprising an outer cover enclosing said data transmitting and receiving means, said data processing means, said clock generating means, said battery, and said clock stopping means, said outer cover having a pair of insertion holes through which said first and second leg portions of said conductive member may be inserted for connection of said input terminal to said ground terminal.

6. A non-contact integrated circuit card for receiving a removable member external to the integrated circuit card, the integrated circuit card comprising:

data transmitting and receiving means for transmitting and receiving data;

data processing means connected to said data transmitting and receiving means for processing data;

clock generating means for generating a clock signal and for supplying the clock signal to said data processing means;

a battery for supplying electrical power to said data transmitting and receiving means, said data processing means, and said clock generating means;

clock stopping means powered by said battery for stopping generation of the clock signal by said clock generation means; and a removable electrically conductive member for connection to said integrated circuit card to actuate said clock stopping means.

7. The non-contact integrated circuit card as claimed in claim 6 including an outer cover enclosing said data transmitting and receiving means, said data processing means, said clock generating means, said battery, and said clock stopping means, said outer cover including a pair of insertion holes through which leg portions of said removable member may be simultaneously inserted for connection to said integrated circuit card and for stopping generation of the clock signal.

* * * * *